UNITED STATES PATENT OFFICE 2,475,423

ALPHA-FLUOROMETHYL STYRENES AND POLYMERS THEREOF

Joseph B. Dickey and Theodore E. Stanin, Rochester, N. Y., assignors to Eastman Kodak Company, Rochester, N. Y., a corporation of New Jersey No Drawing. Application April 13, 1948, Serial No. 20,837

9 Claims. (Cl. 260—74)

This invention relates to styrene compounds which are substituted in the alpha position of the vinyl group with a difluoromethyl or a trifluoromethyl group, polymers thereof, and to methods for preparing the same.

The new compounds may be represented by the structural formulas:

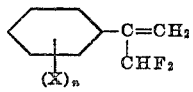

and

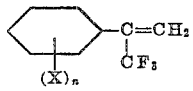

wherein $n$ represents a whole number from 1 to 5 and X represents a monovalent substituent from the group consisting of an atom of hydrogen, a halogen atom (e. g. chlorine, bromine or fluorine), an alkyl group (e. g. methyl, ethyl, propyl, isopropyl, butyl, etc.) and an acid or ester group (e. g. carboxyl, acetoxy, propoxy, butoxy, etc.) and similar groups. The monomers are soluble in most of the common organic solvents such as benzene, chloroform, dioxane, acetone, etc. They are valuable intermediates for the preparation of other useful organic compounds. The monomers show good stability to heat, whereas the alpha-monofluoromethyl styrene is unstable. The monomers are, in addition, polymerizable alone or conjointly with other unsaturated organic compounds, in the presence of polymerization catalysts, to resinous compounds, most of which are soluble in benzene, chloroform, acetone, etc., and which are particularly useful for molding purposes and for the manufacture of textile fibers and threads. The molded or shaped polymers can be worked mechanically to the finished form by methods of milling, sawing, boring, etc.

It is, accordingly, an object of the invention to provide alpha-difluoromethyl and alpha-trifluoromethyl styrenes and polymers thereof. Another object is to provide a method for obtaining the same. Other objects will be come apparent hereinafter.

In accordance with the invention, the new monomeric alpha-difluoromethyl and alpha-trifluoromethyl styrenes are prepared by reacting difluoroacetone or trifluoroacetone with a phenyl magnesium bromide, or by reacting a difluoroacetophenone of a trifluoroacetophenone with methyl magnesium bromide, in a solvent medium of ether, pouring the mixtures onto ice and hydrolyzing, in the presence of a hydrolyzing agent such as sulphuric acid, acetic acid, hydrochloric acid, ammonium chloride, etc., to the corresponding phenyl-difluoromethyl- or phenyl-trifluoromethyl-methyl carbinols, and then dehydrating the carbinols to the alpha-difluoro and alpha-trifluoro styrenes of the invention. The intermediate, 1,1-difluoroacetone compound may be prepared as described by Y. Desirant, Bull. Acad. roy. Belg., 5, 15, page 966 (1929), while the intermediate 1,1,1-trifluoroacetone compound may be prepared as described by F. Swarts, Bull. Acad. roy. Belg., 5, 12, page 690 (1926). The intermediate difluoro- and trifluoroacetophenones may be prepared as described by J. H. Simons et al., J. Am. Chem. Soc., 65, 65, pages 389 and 2064 (1943). The Grignard reaction may be conducted advantageously at a temperature of from —10° C. to 20° C., preferably from —5° C. to 5° C. The dehydrating agent can advantageously be phosphorus pentoxide, oxalic acid, sulphuric acid (40–90 per cent strength), phosphoric acid, zinc chloride, potassium hydroxide, sodium acid sulfate, aluminum phosphate or other well known dehydrating reagents. The amount of phosphorus pentoxide can vary from 0.3 to 1 mole per mole of the carbinol.

The polymerization of the new alpha-fluoro substituted styrenes alone or conjointly with one or more other unsaturated organic compounds is accelerated by heat and by polymerization catalysts which are known to accelerate the polymerization of vinyl compounds. Exemplary of such catalysts are the organic peroxides (e. g. benzoyl peroxide, acetyle peroxide and lauroyl peroxide), hydrogen peroxide, perborates (e. g. alkali metal perborates), persulfates (e. g. alkali metal persulfates), and boron trifluoride. The polymerization can be effected in mass or in the presence of an inert diluent such as dioxane. However, the monomers can also be emulsified in a liquid in which they are insoluble (e. g. in water) and the emulsion then subjected to polymerization. The monomers can also be suspended in water using a relatively poor dispersing agent such as starch, and polymerized in the form of granules. The monomers can also be copolymerized with one or more copolymerizable unsaturated organic compounds, for example, with vinyl acetate, vinyl butyrate, vinyl trifluoroacetate, methyl acrylate, methyl methacrylate, styrene, orthoacetamino styrene, alpha-methyl styrene, 2,4-dichloro-alpha-methyl styrene, acrylonitrile, alpha-methacrylonitrile, alpha-acetoxyacrylonitrile, alpha-acetoxy methacrylate, vinyl chloride, vinyl fluoride, vinylidene dichloride, vinylidene chloride-fluoride, vinylmethylketone, trifluoromethyl vinyl ketone, vinyl-methylether, vinyl-ω-trifluoroethyl ether, vinylmethylsulfone, vinyl sulfonamide, methyl fumarate, methyl maleate, fumaronitrile, cis- and trans-β-cyano and carboxamido-methyl acrylate, vinyl methyl urethane, acrylamide, acrylic acid ethyl amide, vinyl phthalimide, vinyl succinimide, acrylic acid, maleic anhydride, ethylene, isobutylene, butadiene, alpha-acetoxybutadiene-1,3, and similar unsaturated organic compounds.

The copolymers of the invention may contain variable amounts of each comonomer and are obtained with starting polymerization mixtures having from 5 to 95 molecular proportions of the new unsaturates and from 95 to 5 molecular proportions of the above-mentioned other unsaturated organic compounds. However, the preferred copolymers contain from 10 to 90 molecular proportions of the new alpha-fluoromethyl styrenes and from 90 to 10 molecular proportions of the other unsaturated organic compounds, although in the case of copolymers with acrylonitrile and substituted acrylonitriles the best ratios are from 25 to 50 molecular proportions of the alpha-fluoromethyl styrenes to from 75 to 50 molecular proportions of the acrylonitrile. The temperature of polymerization may be varied from 30° C. to 120° C., preferably from 50° C. to 100° C., although in cases where high pressure is employed the temperature may be as high as 225° C., and where an ionic catalyst such as boron trifluoride is used the temperature may be as low as −75° C. Where the polymerization is carried out in an inert solvent medium such as 1,4-dioxane, the concentration of the monomers to be polymerized can vary from 1 to 50 per cent of the weight of the solvent employed.

The following examples will serve to illustrate our new unsaturates, polymers thereof, and the manner of preparing the same.

*Preparation of phenyl-difluoromethyl-methyl carbinol*

Phenyl magnesium bromide was prepared by reacting in the ratio of 4.4 grams of bromobenzene to 0.7 gram of magnesium turnings in 14 cc. of ether. 1 mole of the Grignard solution so obtained was cooled to −5° C. and 94 grams (1 mole) of difluoroacetone in 200 grams of ether was added over a period of about one hour, maintaining the temperature at −5° C. meanwhile. The mixture was then poured onto 500 grams of crushed ice and enough 10-15 per cent sulfuric acid added to decompose the complex and to make the mixture just acid to Congo red indicator. The carbinol obtained was removed from the mixture by extraction with benzene, the extract dried with anhydrous calcium sulfate and the practically pure carbinol obtained by fractional distillation of the extract at reduced pressure. The carbinol compound had the following structural formula:

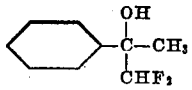

By substituting an equivalent amount of trifluoroacetone in place of the difluoroacetone in the above example, there was obtained the corresponding phenyl-trifluoromethyl-methyl carbinol which can be represented by the formula:

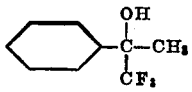

*Preparation of phenyl-trifluoromethyl-methyl carbinol*

Methyl magnesium bromide was prepared in the usual manner by reacting methyl bromide with magnesium turnings in a solvent medium of diethyl ether. An amount equivalent to 1 mole of methyl magnesium bromide was cooled to −5° C. and to this there was added 174 (1 mole) grams of trifluoroacetophenone portionwise over a period of about one hour, while maintaining the temperature of the reaction mixture at −5° C. The mixture was then poured onto 500 grams of crushed ice and enough 10-15 per cent sulfuric acid added to decompose the complex and to make the mixture just acid to Congo red indicator. The carbinol thus obtained was removed from the mixture by extraction with ether, the extract dried with anhydrous calcium sulfate and the practically pure carbinol obtained from the extract by fractional distillation under reduced pressure. The product by analysis was practically pure phenyl-trifluoromethyl-methyl carbinol.

By substituting an equivalent amount of difluoroacetophenone in the above example, there was obtained phenyl-difluoromethyl-methyl carbinol.

*Example 1.—Preparation of alpha-difluoromethyl styrene*

17 grams of phenyl-difluoromethyl-methyl carbinol were added dropwise to 7 grams of phosphorus pentoxide at 0° C. The mixture was then slowly heated until distillation under reduced pressure at approximately 1 mm. could be carried out. A small amount of copper salt (e. g. copper acetate) was found to be advantageous. A clear, colorless product, which was soluble in most of the common organic solvents, was obtained. The carbon, hydrogen and fluorine analysis agreed with the theoretical formula.

By substituting an equivalent amount of phenyl-trifluoromethyl-methyl carbinol in place of the phenyl-difluoromethyl-methyl carbinol in the above example, there was obtained substantially pure alpha-trifluoromethyl styrene. This product was a clear, colorless substance, which was soluble in most of the common organic solvents. The analysis for carbon, hydrogen and fluorine agreed with the theoretical formula.

Similar results of dehydrating the carbinols to the indicated alpha-fluoromethyl styrenes can be obtained by employing other dehydrating reagents in larger amounts in place of phosphorus pentoxide, for example, oxalic acid, sulfuric acid (40-90% strength), phosphoric acid, zinc chloride, potassium hydroxide, sodium acid sulfate or aluminum phosphate.

*Example 2.—Poly-alpha-difluoromethyl styrene*

15.4 grams of alpha-difluoromethyl styrene were heated at 50° C. in an atmosphere of nitrogen, in the presence of 0.15 gram of benzoyl peroxide. After heating for several hours, there was obtained a clear, moldable solid. The polymer was soluble in organic solvents such as dioxane, acetone, ethyl acetate, ethylene dichloride, and the like, and was stable to temperatures in excess of 200° C.

*Example 3.—Poly-alpha-trifluoromethyl styrene*

(a) 30 grams of alpha-trifluoromethyl styrene were added to a solution of 5 grams of Aerosol OT (dioctyl sodium sulfosuccinate), 0.3 gram of potassium persulfate and 0.5 gram of polyvinyl alcohol in 100 cc. of distilled water. The mixture was placed in a pressure bottle, which was clamped in a shaking machine equipped with heaters, and shaken and heated at 60° C. for a period of 20 hours. The emulsion so obtained was added to 200 cc. of a 10 per cent solution of aluminum sulfate and heated to 80° C. The coagulated polymer was then filtered off, washed and dried. The yield of white powder was 28 grams. By the addition of 0.3 to 0.6 gram of sodium bisulfite to the polymerization mixture, the time required for complete polymerization can be reduced to about 3 hours in the above example. The polymer was soluble in most organic solvents, and was stable to temperatures in excess of 200° C.

In place of alpha-trifluoromethyl styrene in the above example, there can be substituted an equivalent amount of alpha-difluoromethyl styrene to give similar resinous polymers.

(b) 15 grams of alpha-trifluoromethyl styrene were chilled to −78° C. with dry ice and acetone, and boron trifluoride gas was slowly introduced into the vessel above the surface of the monomer, while agitating with a glass rod. Within one minute polymerization was complete. The polymer so obtained was washed well with alcohol to remove the catalyst, and then dried.

The above process of polymerization can also be accomplished by dissolving the monomer in an inert solvent such as a low boiling hydrocarbon liquid (e. g. pentane or hexane) and introducing the boron trifluoride gas above the surface of the reaction mixture. Instead of boron trifluoride, there can be substituted in the above example aluminum trichloride in methyl bromide as the polymerization catalyst.

*Example 4.—Copolymer of alpha-difluoromethyl styrene and vinyl acetate*

15.4 grams of alpha-difluoromethyl styrene, 8.6 grams of vinyl acetate and 0.24 gram of benzoyl peroxide were sealed in a stoppered bottle in an atmosphere of nitrogen and heated until completely polymerized at 50° C. A colorless, tough and moldable polymer was thus obtained.

In place of vinyl acetate in the above example, there can be substituted an equivalent amount of isopropenyl acetate, vinyl benzoate, vinyl trifluoroacetate, or p-acetamino-isopropenyl benzoate to obtain similar kinds of copolymers. Although equimolar proportions of alpha-difluoromethyl styrene and vinyl acetate are shown in the above example, it will be understood that the molar ratios of the comonomers can be varied over a wide range, for example, from 5 to 95 molecular proportions of alpha-difluoromethyl styrene to from 95 to 5 molecular proportions of the other monomer.

*Example 5.—Copolymer of alpha-trifluoromethyl styrene and methyl methacrylate*

17.2 grams of alpha-trifluoromethyl styrene, 5 grams of methyl methacrylate and 0.22 gram of benzoyl peroxide were mixed together and added with stirring to 75 cc. of an aqueous solution containing 0.38 gram of polymethacrylic acid. The mixture was adjusted to a pH of 6.5 by adding a buffering solution of disodium acid phosphate and sodium dihydrogen phosphate, and suspension so obtained then tumbled in a container at a temperature of 50° C. for a period of three days. The colorless, transparent pearls which separated had a high fusion point and were soluble in most of the common organic solvents, and could be molded into desired shapes.

In place of the methyl methacrylate in the above example, there can be substituted an equivalent amount of methyl acrylate, β-acetaminoethyl-methacrylate, methyl alpha-chloro-acrylate or methyl alpha-fluoro-acrylate to obtain similar copolymeric resins.

*Example 6.—Copolymer of alpha-trifluoromethyl styrene and acrylonitrile*

16.9 grams of alpha-trifluoromethyl styrene, 5.3 grams of acrylonitrile and 0.23 gram benzoyl peroxide were mixed together and added with stirring to 75 cc. of an aqueous solution containing 0.38 gram of polymethacrylic acid. The mixture was adjusted to a pH of 6.5 by adding a buffering mixture of mono and di sodium acid phosphates. The resulting suspension was heated at 50° C. for a period of three days. A light yellow colored granular solid was obtained. A solution of this copolymer in acetone gave on spinning a flexible tough thread. Similar threads were likewise obtained by spinning solutions of the copolymer in β-hydroxypropionitrile, in aqueous zinc chloride or in sodium and zinc thiocyanate. The ratio of alpha-trifluoromethyl styrene and acrylonitrile making up the copolymer can be varied widely by varying the amounts of the comonomers in the polymerization mixtures. Useful copolymers having from 25 to 50 molecular proportions of the alpha-trifluoromethyl styrene and from 75 to 50 molecular proportions of the acrylonitrile may be prepared in the manner of the above example.

*Example 7.—Copolymer of para-chloro-alpha-trifluoromethyl styrene and acrylonitrile*

20.7 grams of para-chloro-alpha-trifluoromethyl styrene, 5.3 grams of acrylonitrile and 0.26 gram of benzoyl peroxide were mixed together and added with stirring to 75 cc. of an aqueous solution containing 0.38 gram of polymethacrylic acid. The mixture was adjusted to a pH of 6.5 by adding a buffering mixture of disodium acid phosphate and sodium dihydrogen phosphate, and the suspension so obtained stirred in a container at a temperature of 50° C. for a period of three days. A yellowish granular solid was obtained. Flexible and tough fibers were obtained on spinning an acetone solution of the copolymer. Similar fibers were also obtained by spinning solutions of the copolymer in β-hydroxypropionitrile, in aqueous zinc chloride or in sodium and zinc thiocyanate.

In place of acrylonitrile in the above example, there can be substituted an equivalent amount of alpha-methacrylonitrile, alpha-fluoroacrylonitrile, or alpha-carboethoxyacrylonitrile to give copolymers from which equally valuable fibers can be prepared.

*Example 8.—Copolymer of alpha-difluoromethyl styrene and vinyl chloride*

15 grams of alpha-difluoromethyl styrene, 6.3 grams of vinyl chloride and 0.21 gram of benzoyl peroxide were sealed in a tube in an atmosphere of nitrogen and heated at 50° C. for a period of 18 hours. The resulting copolymer was a clear, tough and moldable resin. In place of the vinyl chloride in the above example, there can be substituted vinyl fluoride to give a similar resinous copolymer. Although equimolar proportions of comonomers are shown in the above example, equally useful resinous copolymers having different molar ratios of the monomeric groups making up the copolymer can be prepared by varying the molar proportions of the monomers in the starting polymerization mixtures. Thus, for example, the alpha-fluoromethyl styrene can be varied from 5 to 95 molecular proportions and the unsaturated compound to be copolymerized therewith can be varied from 95 to 5 molecular proportions.

*Example 9.—Copolymer of alpha-trifluoromethyl styrene and styrene*

A mixture consisting of 10 grams of alpha-trifluoromethyl styrene, 10 grams of styrene and 0.2 gram of benzoyl peroxide was added with stirring to 75 cc. of an 0.5% aqueous solution of polymethacrylic acid and the pH adjusted to 6.5 with a buffering mixture of mono and disodium hydrogen phosphates. The mixture was then agitated in a container having some free space in a 50° C. water bath for a period of three days. A clear, moldable resinous copolymer was obtained in granular form.

*Example 10.—Copolymer of 4-methyl-alpha-trifluoromethyl styrene and vinylidene dichloride*

A mixture of 10 grams of 4-methyl-alpha-trifluoromethyl styrene, 6 grams of vinylidene dichloride and 0.16 gram of benzoyl peroxide was placed in a sealed tube in an atmosphere of nitrogen and heated at 50° C. for a period of 18 hours. A clear, moldable resin was obtained.

In place of vinylidene dichloride in the above example, there can be substituted an equivalent amount of vinylidene chloride-fluoride to give a similar resinous copolymer.

*Example 11.—Copolymer of para-phenyl-alpha-difluoromethyl styrene and styrene*

A mixture consisting of 10 grams of para-phenyl-alpha-difluoromethyl styrene, 10 grams of styrene and 0.2 gram of benzoyl peroxide was added with stirring to 75 cc. of an aqueous solution containing 0.38 gram of polymethacrylic acid. The pH of the mixture was adjusted to about 6.5 by addition of a buffering mixture of disodium acid phosphate and sodium dihydrogen phosphate. The mixture was then agitated by tumbling in a container having some unfilled space, in a 50° C. water bath for a period of three days. A clear, moldable resinous copolymer was obtained in granular form.

By substituting an equivalent amount of alpha-chloro-styrene, ortho-acetamino styrene, alpha-methyl styrene, 2,4-dichloro styrene or ortho-hydroxy styrene in place of the styrene in the above example, there may be obtained similar moldable resinous copolymers.

*Example 12.—Copolymer of alpha-difluoro styrene and butadiene*

A mixture consisting of 10 grams of alpha-difluoro styrene, 20 grams of butadiene and 0.3 gram of benzoyl peroxide was added to 100 cc. of aqueous 0.5 per cent polymethacrylic acid solution. A buffer solution of disodium acid phosphate and sodium dihydrogen phosphate was added to adjust the mixture to a pH of 6.5. The mixture was then placed in an oversize container and tumbled in a 50° C. water bath for several days. A tough, rubbery, vulcanizable resin was obtained.

By substituting an equivalent amount of 2-methyl butadiene, 2,3-dimethyl butadiene, 2-chlorobutadiene, 2-cyano-butadiene, 1-acetoxy butadiene, 2-acetoxy butadiene, 2-chloro-3-methyl butadiene or 2-acetamino butadiene in place of butadiene in the above example, there may be obtained similar rubbery and vulcanizable resinous copolymers.

*Example 13.—Copolymer of 2-methyl-alpha-trifluoromethyl styrene and isopropyl fumarate*

10 grams of 2-methyl-alpha-trifluoromethyl styrene, 10 grams of isopropyl fumarate and 0.2 gram of benzoyl peroxide were sealed in a glass tube in an atmosphere of nitrogen and heated at 50° C. for a period of 18 hours. A clear, hard polymer was obtained.

In place of isopropyl fumarate in the above example, there may be substituted an equivalent amount of fumaric and maleic acid derivatives such as those represented by the formula:

$$X-C=C-Y$$

wherein X and Y are selected from the group —COOH, —CN, —COOR, wherein R represents a saturated alkyl group containing from 1 to 4 carbon atoms, and wherein X and Y may be different groups, to obtain similar resinous copolymers.

*Example 14.—Copolymer of alpha-difluoromethyl styrene and ethylene*

10 grams of alpha-difluoromethyl styrene were placed in a super pressure autoclave and ethylene was admitted until a pressure of approximately 2000 atmospheres had been reached. The autoclave was then slowly heated until the mixture reached a temperature of 225° C. A tough, elastic, moldable solid resinous copolymer of alpha-difluoromethyl styrene and ethylene was obtained.

*Example 15.—Copolymer of alpha-trifluoromethyl styrene and vinyl acetate and ethylene*

5 grams of alpha-trifluoromethyl styrene and 5 grams of vinyl acetate were placed in a high pressure autoclave, and then ethylene gas was forced in until a pressure of 2000 atmospheres was reached. The mixture was heated at a temperature of 50° C. until polymerization was complete. A clear, tough and moldable resin was obtained.

*Example 16.—Copolymer of alpha-difluoromethyl styrene and acrylic acid amide and ethylene*

5 grams of alpha-difluoromethyl styrene and 0.5 gram of acrylic acid amide were placed in a high pressure autoclave and ethylene gas pressed in until a pressure of 1000 atmospheres was reached. The mixture was then slowly raised to a temperature of 50° C. at which point it was maintained until polymerization was complete. A clear, tough and moldable resin was obtained.

We claim:

1. A compound selected from the group consisting of an alpha-difluoromethyl styrene and an alpha-trifluoromethyl styrene.

2. An alpha-trifluoromethyl styrene.

3. Alpha-trifluoromethyl styrene.

4. An alpha-difluoromethyl styrene.

5. Alpha-difluoromethyl styrene.

6. A polymer of a compound selected from the group consisting of an alpha-difluoromethyl styrene and an alpha-trifluoromethyl styrene.

7. A copolymer obtained by heating in the presence of a polymerization catalyst a mixture comprising from 25 to 50 molecular proportions of alpha-trifluoromethyl styrene and from 75 to 50 molecular proportions of acrylonitrile.

8. A copolymer obtained by heating in the presence of a polymerization catalyst a mixture comprising from 5 to 95 molecular proportions of alpha-trifluoromethyl styrene and from 95 to 5 molecular proportions of methyl methacrylate.

9. A copolymer obtained by heating in the presence of a polymerization catalyst a mixture comprising from 5 to 95 molecular proportions of an alpha-trifluoromethyl styrene and from 95 to 5 molecular proportions of styrene.

JOSEPH B. DICKEY.
THEODORE E. STANIN.

REFERENCES CITED

The following references are of record in the file of this patent:

UNITED STATES PATENTS

| Number | Name | Date |
| --- | --- | --- |
| 2,414,330 | Renoll | Jan. 14, 1947 |